US012698239B2

(12) United States Patent
Yoshimitsu et al.

(10) Patent No.: US 12,698,239 B2
(45) Date of Patent: Aug. 4, 2026

(54) CORDIERITE-BASED CERAMIC(S) AND MEMBER FOR A TELESCOPE

(71) Applicant: KYOCERA Corporation, Kyoto (JP)

(72) Inventors: Hiroshi Yoshimitsu, Kagoshima (JP); Shuzo Iwashita, Kirishima (JP); Hirotsugu Nodake, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 525 days.

(21) Appl. No.: 17/278,581

(22) PCT Filed: Sep. 20, 2019

(86) PCT No.: PCT/JP2019/037022
§ 371 (c)(1),
(2) Date: Mar. 22, 2021

(87) PCT Pub. No.: WO2020/066914
PCT Pub. Date: Apr. 2, 2020

(65) Prior Publication Data
US 2021/0347696 A1        Nov. 11, 2021

(30) Foreign Application Priority Data

Sep. 26, 2018        (JP) ................................. 2018-180496

(51) Int. Cl.
*C04B 35/195*        (2006.01)
(52) U.S. Cl.
CPC .... *C04B 35/195* (2013.01); *C04B 2235/3298* (2013.01); *C04B 2235/3409* (2013.01);
(Continued)

(58) Field of Classification Search
CPC .......... C04B 35/195; C04B 2235/3298; C04B 2235/3409; C04B 2235/3481; C04B 2235/9607; G02B 7/183
See application file for complete search history.

(56) References Cited

U.S. PATENT DOCUMENTS 3,450,546 A * 6/1969 Stong .................. C03C 10/0045
                                                                501/63
5,130,280 A 7/1992 Dupon et al.
(Continued)

FOREIGN PATENT DOCUMENTS

JP        2005-272199 A        10/2005
JP        2016-204198 A        12/2016

OTHER PUBLICATIONS https://science.howstuffworks.com/question421.htm#:~:text=One%2Dway%20mirrors%20are%20coated,other%20half%20go%20straight%20through. Accessed Nov. 12, 2025 (Year: 2025).*
(Continued)

*Primary Examiner* — Cameron K Miller
(74) *Attorney, Agent, or Firm* — Procopio, Cory, Hargreaves & Savitch LLP

(57) ABSTRACT
A cordierite-based ceramic(s) is provided where a main crystalline phase thereof is a cordierite crystalline phase, a content of Mg is 13.2% by mass or more and 13.8% by mass or less in an MgO equivalent, a content of Al is 26.0% by mass or more and 32.1% by mass or less in an $Al_2O_3$ equivalent, a content of Bi is 1.6% by mass or more and 4.6% by mass or less in a $Bi_2O_3$ equivalent, a content of B is 1.5% by mass or more and 6.8% by mass or less in a $B_2O_3$ equivalent, and a content of Si is 49.4% by mass or more and 51.4% by mass or less in an $SiO_2$ equivalent.

12 Claims, 2 Drawing Sheets

(52) U.S. Cl.
CPC ................ *C04B 2235/3481* (2013.01); *C04B*
*2235/9607* (2013.01)

(56) References Cited

U.S. PATENT DOCUMENTS

| | | | |
|---|---|---|---|
| 6,391,813 | B1 | 5/2002 | Merkel |
| 9,771,303 | B2 | 9/2017 | Isoda et al. |
| 10,125,051 | B2 | 11/2018 | Sugawara |
| 2012/0100982 | A1* | 4/2012 | Sugawara ......... C04B 35/62695 |
| | | | 501/152 |
| 2018/0118625 | A1 | 5/2018 | Sugawara |
| 2019/0047915 | A1* | 2/2019 | Itoh .......................... H05K 3/46 |

OTHER PUBLICATIONS https://en.wikipedia.org/wiki/Vantablack Accessed Nov. 12, 2025
(Year: 2025).*
https://www.astroshop.eu/magazine/information/telescope-information/
the-components-in-a-telescope/mirror/i,1090#:~:text=Today%2C%
20modern%20glass%20and%20glass,mirrors%20and%20aspherical%
20parabolic%20mirrors. Accessed Nov. 12, 2025 (Year: 2025).*
Hao, Xiaojun, et al. "Preparation and properties of transparent
cordierite-based glass-ceramics with high crystallinity." Ceramics
International 41.10 (2015): 14130-14136. (Year: 2015).*

* cited by examiner

FIG.2

CORDIERITE-BASED CERAMIC(S) AND MEMBER FOR A TELESCOPE

CROSS-REFERENCE TO RELATED APPLICATION(S)

This application is a national stage application of International Application No. PCT/JP2019/037022 filed on Sep. 20, 2019, which designates the United States, the entire contents of which are herein incorporated by reference, and which is based upon and claims the benefit of priority to Japanese Patent Application No. 2018-180496 filed on Sep. 26, 2018, the entire contents of which are herein incorporated by reference.

FIELD

The present disclosure relates to a cordierite-based ceramic(s) and a member for a telescope that uses it/them.

BACKGROUND

In recent years, a ceramic member that has a low expansion property is applied to instruments in a variety of fields. As such a ceramic(s) with a low thermal expansion property, attention is paid to a cordierite-based ceramic(s) in recent years (see, for example, Patent Literature 1).

CITATION LIST

Patent Literature

Patent Literature 1: Japanese Patent Application Publication No. 2016-204198

SUMMARY

A cordierite-based ceramic(s) in the present disclosure is/are provided in such a manner that a cordierite crystalline phase is provided as a main crystalline phase, Mg is of 13.2% by mass or more and 13.8% by mass or less in an MgO equivalent, Al is of 26.0% by mass or more and 32.1% by mass or less in an $Al_2O_3$ equivalent, Bi is of 1.6% by mass or more and 4.6% by mass or less in a $Bi_2O_3$ equivalent, B is of 1.5% by mass or more and 6.8% by mass or less in a $B_2O_3$ equivalent, and Si is of 49.4% by mass or more and 51.4% by mass or less in an $SiO_2$ equivalent.

A member for a telescope in the present disclosure is composed of the cordierite-based ceramic(s) as described above.

BRIEF DESCRIPTION OF DRAWINGS

FIG. 2 is a graph that enlarges and illustrates a part P on a graph of a curved line A as illustrated in FIG. 1.

DESCRIPTION OF EMBODIMENTS

Figure 1:
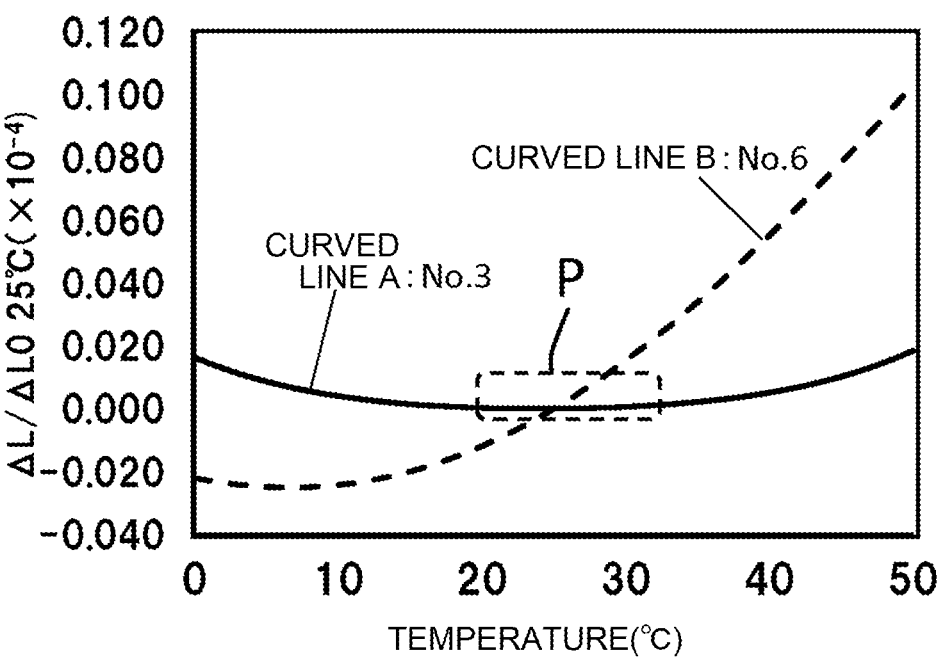
FIG. 1 is a graph that illustrates a change of thermal expansion of a cordierite-based ceramic(s).

A cordierite-based ceramic(s) in the present disclosure satisfies/satisfy a composition where a cordierite crystalline phase is provided as a main crystalline phase, Mg is of 13.2% by mass or more and 13.8% by mass or less in an MgO equivalent, Al is of 26.0% by mass or more and 32.1% by mass or less in an $Al_2O_3$ equivalent, Bi is of 1.6% by mass or more and 4.6% by mass or less in a $Bi_2O_3$ equivalent, B is of 1.5% by mass or more and 6.8% by mass or less in a $B_2O_3$ equivalent, and Si is of 49.4% by mass or more and 51.4% by mass or less in an $SiO_2$ equivalent.

As a configuration as described above is satisfied, a cordierite-based ceramic(s) in the present disclosure exhibit(s) a pseudo thermal expansion rate in a temperature range of 20 to 30° C. that is $2 \times 10^{-7}$° C. or lower. Furthermore, for a cordierite-based ceramic(s) in the present disclosure, ΔCTE in a temperature range of 20 to 30° C. is $92 \times 10^{-9}$/K or less, so that a thermal expansion rate is small even in a large temperature width. Herein, ΔCTE in a temperature range of 20 to 30° C. is a value that is obtained by obtaining a difference between a maximum value and a minimum value of a thermal expansion coefficient at each temperature in 20 to 30° C. that is measured in conformity with JIS R1618:2002.

Herein, cordierite that is provided as a main crystalline phase refers to a cordierite-based ceramic(s) that include(s) 80% by mass or more of cordierite. In such a case, a crystalline phase or a non-crystalline phase other than cordierite may be included as long as a characteristic thereof is deteriorated.

Figure 2:
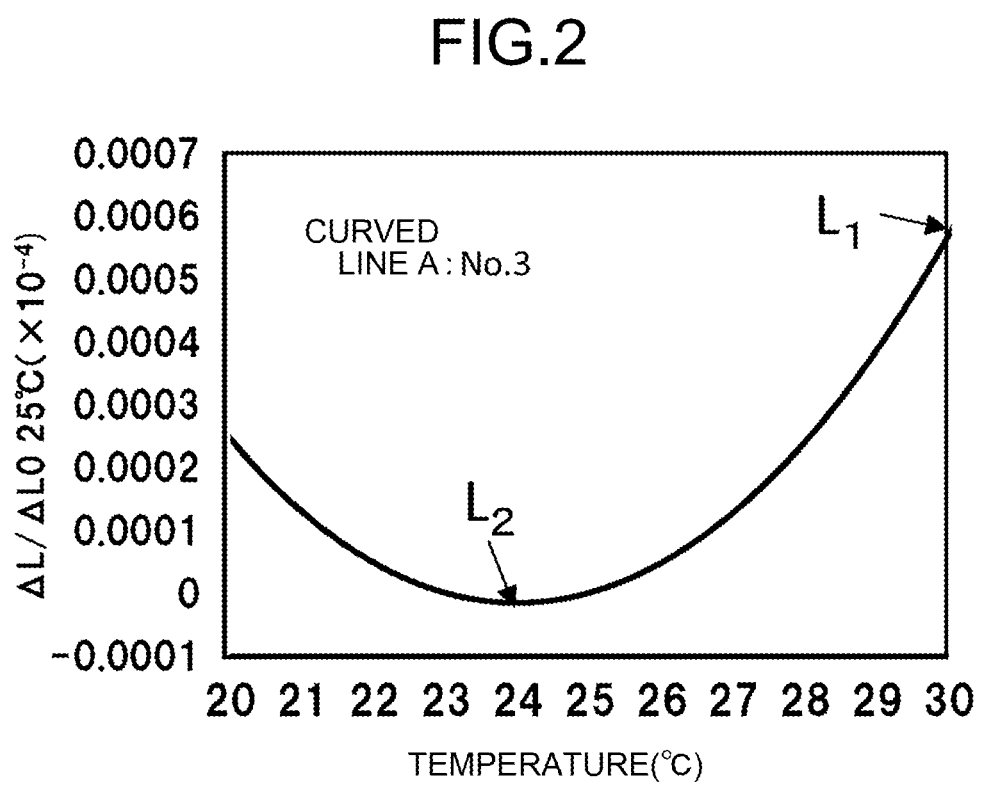

FIG. 1 is a graph that illustrates a change of thermal expansion of a cordierite-based ceramic(s). FIG. 2 is a graph that enlarges and illustrates a part P on a graph of a curved line A as illustrated in FIG. 1. A horizontal axis of a graph represents a temperature. A vertical axis thereof represents an extension rate of a cordierite-based ceramic(s) at a time when a length thereof at 25° C. is a reference thereof.

A curved line A indicates a change of thermal expansion of a cordierite-based ceramic(s) in the present embodiment. A composition thereof satisfies a composition where Mg is of 13.6% by mass in an MgO equivalent, Al is of 29.3% by mass in an $Al_2O_3$ equivalent, Bi is of 3.2% by mass in a $Bi_2O_3$ equivalent, B is of 3.1% by mass in a $B_2O_3$ equivalent, and Si is of 50.8% by mass in an $SiO_2$ equivalent. A curved line A corresponds to a sample of No. 3 in a practical example(s) as described later. A cordierite-based ceramic(s) for a curved line A has/have a temperature where an extension rate is minimum (that is referred to as an NPO temperature below) in a temperature region near a room temperature (15 to 30° C.) in a temperature range of 0° C. to 50° C., and exhibits behavior of an extension rate that is gradually increased from an NPO temperature to a lower temperature side and a higher temperature side thereof. In other words, a curved line A indicates a negative slope (a sign N) where an extension rate is gradually decreased with a temperature rise in a temperature region that is lower than an NPO temperature. On the other hand, a positive slope (a sign P) where an extension rate is gradually increased with a temperature rise is indicated in a temperature region with a temperature that is higher than an NPO temperature. That is, a cordierite-based ceramic(s) for a curved line A has/have an NPO temperature near a room temperature and exhibits behavior of a slope of a thermal expansion curved line that is provided in an opposite direction while such an NPO temperature is a boundary thereof. Hereinafter, behavior of thermal expansion for a curved line A will be referred to as a U-shape as an abbreviation.

Herein, a pseudo thermal expansion rate will be explained that is an index of a thermal expansion rate where a case where thermal expansion behavior indicates a U-shape as described above is also taken into consideration. A pseudo thermal expansion rate is a value where a difference $(L_1-L_2)$ between a maximum value $L_1$ and a minimum value $L_2$ of an extension rate of a target temperature range is divided by the target temperature range.

A pseudo thermal expansion rate is a value that is identical to a thermal expansion rate in a case where an extension rate is of a monotonic increase in a target temperature range and is a positive or negative value that is opposite to the thermal expansion rate in a case of a monotonic decrease thereof. Furthermore, in a case where behavior of thermal expansion in a target temperature range indicates a U-shape as described above, a pseudo thermal expansion rate is a large value if a bottom of a U-shape is deep and is a small value if the bottom of the U-shape is shallow.

A pseudo thermal expansion rate for a curved line A will be obtained based on FIG. 2. As a difference $(L_1-L_2)$ between a maximum value $(L_1=0.569\times10^{-7})$ and a minimum value $(L_2=-0.0162\times10^{-7})$ of an extension rate at 20 to 30° C. for a curved line A is divided by a temperature range (10° C.), a pseudo thermal expansion rate for a curved line A is $0.06\times10^{-7}/°$ C. In such a case, an NPO temperature is near 24° C. In such a case, ΔCTE in a temperature range of 20 to 30° C. is $34\times10^{-9}$/K.

On the other hand, a curved line B is to have a composition where Mg is of 18.3% by mass in an MgO equivalent, Al is of 31.4% by mass in an $Al_2O_3$ equivalent, Bi is of 2.9% by mass in a $Bi_2O_3$ equivalent, B is not included or is of 0% by mass in a $B_2O_3$ equivalent, and Si is of 47.3% by mass in an $SiO_2$ equivalent. A curved line B corresponds to a sample of sample No. 6 as described later. Behavior of thermal expansion for a curved line B is also a U-shape similarly to a curved line A.

Herein, as a difference between a maximum value $(0.0154\times10^{-4})$ and a minimum value $(-0.0119\times10^{-4})$ of an extension rate at 20 to 30° C. for a curved line B is divided by a temperature range (10° C.) for also obtaining a pseudo thermal expansion rate for the curved line B, a pseudo thermal expansion rate for a curved line B is $2.7\times10^{-7}/°$ C. In such a case, an NPO temperature is near 20° C. In such a case, ΔCTE in a temperature range of 20 to 30° C. is $140\times10^{-9}$/K.

As can be seen from FIG. 1, a pseudo thermal expansion rate of a cordierite-based ceramic(s) that has/have a composition of sample No. 3 is less than that of a cordierite-based ceramic(s) with a composition of sample No. 6 that is outside such a composition.

As described above, behavior of thermal expansion of a cordierite-based ceramic(s) is changed by a slight change of a composition of B (boron) and Bi (bismuth). That is, in a case where B is included singly or a case where Bi is included singly when cordierite $(Mg_2Al_4Si_5O_{18})$ is provided as a basic composition, behavior of pseudo thermal expansion is enhanced. Thus, as B and Bi coexist in a cordierite-based ceramic(s) so as to limit a composition thereof, behavior of thermal expansion exhibits a U-shape, so that it is possible to obtain a cordierite-based ceramic(s) with a small thermal expansion rate.

Furthermore, as a composition of a cordierite-based ceramic(s) in the present embodiment is limited, it is possible to further decrease a thermal expansion rate in a temperature range of 0° C. to 50° C.

For example, as Mg is of 13.5% by mass or more and 13.8% by mass or less in an MgO equivalent, Al is of 28.5% by mass or more and 32.1% by mass or less in an $Al_2O_3$ equivalent, Bi is of 1.6% by mass or more and 4.0% by mass or less in a $Bi_2O_3$ equivalent, B is of 1.5% by mass or more and 4.0% by mass or less in a $B_2O_3$ equivalent, and Si is of 50.2% by mass or more and 51.4% by mass or less in an $SiO_2$ equivalent, it is possible to provide a pseudo thermal expansion rate that is $1.67\times10^{-7}$/K or less.

Moreover, as Mg is of 13.6% by mass or more and 13.8% by mass or less in an MgO equivalent, Al is of 28.5% by mass or more and 29.3% by mass or less in an $Al_2O_3$ equivalent, Bi is of 2.2% by mass or more and 3.2% by mass or less in a $Bi_2O_3$ equivalent, B is of 3.1% by mass or more and 4.0% by mass or less in a $B_2O_3$ equivalent, and Si is of 50.8% by mass or more and 51.4% by mass or less in an $SiO_2$ equivalent, it is possible to provide a pseudo thermal expansion rate that is $0.55\times10^{-7}$/K or less.

In such a case, it is preferable that a minimum value of an extension rate (an NPO temperature) of a cordierite-based ceramic(s) is 23 to 27° C. when thermal expansion thereof is measured.

Furthermore, it is preferable that such a cordierite-based ceramic(s) is/are of a composition where Mg is of 13.5% by mass or more and 13.8% by mass or less in an MgO equivalent, Al is of 28.5% by mass or more and 30.2% by mass or less in an $Al_2O_3$ equivalent, Bi is of 2.2% by mass or more and 4.0 by mass or less in a $Bi_2O_3$ equivalent, B is of 2.1% by mass or more and 4.0% by mass or less in a $B_2O_3$ equivalent, and Si is of 50.2% by mass or more and 51.4% by mass or less in an $SiO_2$ equivalent. In such a case, a water absorption rate of a cordierite-based ceramic(s) is 0.05% or less, a pseudo thermal expansion rate thereof is $0.63\times10^{-7}$/K or less, a bulk density of a sintered body of a whole sample thereof is 2.48 $g/cm^3$, and a Young's modulus of a sample that is a sintered body thereof is 136 GPa or greater. Moreover, it is possible to provide a specific stiffness that is obtained by dividing a Young's modulus by a bulk density and is 55 $(GPa\cdot cm^3)$/g or greater.

A stiffness of a cordierite-based ceramic(s) in the present embodiment is high and a thermal expansion rate thereof is small in a wide temperature range, so that it is suitable for an instrument where a small dimension change thereof is needed even if a temperature of an environment thereof is changed. For example, it is possible to provide a high-precision reflective mirror member that is used for an astronomical telescope or the like or a fixing member of an optical device. In such a case, it is possible to attain speeding up of adjustment of an optical axis thereof. Furthermore, it is possible to improve a vibration-damping property of a whole instrument. Furthermore, a mechanical strength thereof is high, so that long-time reliability thereof is excellent. Furthermore, such a cordierite-based ceramic(s) does/ do not substantially include mullite, so that it is possible to decrease a surface roughness (Ra, PV) thereof after processing thereof. Hence, it is suitable as a member for optics such as a reflective mirror member.

Furthermore, it is preferable that a cordierite-based ceramic(s) as described above is dense in that it is possible to decrease a pseudo thermal expansion rate thereof and stabilize a thermal expansion characteristic thereof. For example, it is preferable that a water absorption rate of a sintered body thereof is 0.05% or less.

Furthermore, a stiffness of such a cordierite-based ceramic(s) is high and a specific gravity of a sintered body thereof is 2.49 or less that is small. Hence, even if a speed of adjustment of an optical axis of an astronomical telescope or the like as described above is increased, it is possible to decrease vibration that is caused by inertia thereof. Moreover, it is also suitable as a component that is mounted on an artificial satellite where a material with low thermal expansion, a light weight, and a high stiffness is needed.

Practical Examples

Next, a cordierite-based ceramic(s) in the present embodiment was/were fabricated specifically and evaluation of a characteristic thereof was executed. First, respective powders of magnesium hydroxide ($Mg(OH)_2$), alumina, silicon dioxide, boron oxide, and bismuth oxide were prepared as respective raw material powders of Mg, Al, Si, B, and Bi. Furthermore, a powder of calcium carbonate was prepared. Additionally, purities of the respective raw material powders were as follows. A purity of magnesium hydroxide was 99.3%, a purity of alumina was 99.9%, a purity of silicon dioxide was 99.5%, a purity of boron oxide was 95.0%, a purity of bismuth oxide was 99.9%, and a purity of calcium carbonate was 99.5%.

Then, these raw material powders were mixed so as to provide a preparation composition as illustrated in Table 1 and a binder (paraffin wax) was added thereto so as to prepare a granulated powder.

Then, a molded body was fabricated from the prepared granulated powder by press molding and a sample of a cordierite-based ceramic(s) was fabricated by firing thereof in an air atmosphere. Any of fabricated samples was provided in such a manner that a shape thereof was a circularly cylindrical shape, a diameter thereof was 100 mm, and a height thereof was 100 mm. A holding time at a maximum temperature at a time of firing was 2 hours. As a composition of each of the fabricated samples was obtained by ICP emission spectrometric analysis, a composition of any of the samples coincided with the preparation composition.

Then, under-mentioned evaluation of the fabricated samples was executed. A water absorption rate and a bulk density were measured by an Archimedian method. Measurement of a bulk density was executed as follows. First, a bulk density of a sample with a circularly cylindrical shape with a diameter of 100 mm and a height of 100 mm was measured. A number of a sample(s) in this case was one for each sample (No.). A bulk density that was obtained herein was a bulk density of a "whole" as illustrated in Table 2. Then, bulk densities at each of locations of an "outer side" and an "inner side" in Table 2 were obtained. First, a sample with a circularly cylindrical shape with a diameter of 100 mm and a height of 100 mm was substantially trisected in a height direction thereof so as to obtain piece samples. Then, among the substantially trisected piece samples, a sample that was middle in a height direction thereof was used for measuring a bulk density at a location of an "inner side". On the other hand, among the substantially trisected samples, a piece sample at a position other than a middle in a height direction thereof was used for measuring a bulk density at a location of an "outer side". From the substantially trisected samples, piece samples with a length of 20 mm, a width of 15 mm, and a thickness of 30 mm were cut out. Three samples were used for measurement of respective bulk densities. Each bulk density as illustrated in Table 2 was an average value of three samples.

Identification of a crystalline phase and measurement of a rate of the crystalline phase were executed by powder X-ray diffraction and a Rietveld method. For this measurement, a number of each sample was one. Thermal expansion was measured in a temperature range of 0° C. to 50° C. by using an optical heterodyne interferometer while a dimension at 25° C. was a reference thereof. A type of behavior of thermal expansion was determined from measured data. Furthermore, a temperature where an extension rate of a sample at 20 to 30° C. was minimum was determined. Additionally, thermal expansion behavior of any of the fabricated samples exhibited behavior of a U-shape. For these samples, a temperature where an extension rate of a sample at 20 to 30° C. was minimum was provided as an NPO temperature. A pseudo thermal expansion rate was obtained by dividing a difference (for example, $L_1$–$L_2$ in FIG. 2) between a point where an extension rate of a sample at 20 to 30° C. was maximum (for example, $L_1$ in FIG. 2) and a point where it was minimum (for example, $L_2$ in FIG. 2) by a temperature in a measured range (10° C.). Furthermore, ΔCTE in a temperature range of 20 to 30° C. was obtained based on JIS R1618. A number of a sample(s) for such measurement was one for each sample.

Furthermore, a Young's modulus of each of the fabricated samples was obtained by a nanoindenter method. A condition(s) of a nanoindenter method is/are illustrated below. A size(s) of a sample that was used for measurement was/were a length of 12 mm, a width of 4 mm, and a thickness of 3 mm. Processing of mirror surface polishing was applied to a sample that was used for a measurement. Nanoindenter XP produced by MTS Corporation was used as a nanoindenter device. An indenter that was included in Nanoindenter XP was a Berkovich indenter. For a method of application of an indenter, a continuous stiffness measurement method (CSM: Continuous Stiffness Measurement) was used. An indentation depth of an indenter was up to 2000 nm. A value of a Young's modulus as illustrated in Table 2 was an average value of values at indentation depths of up to 2000 nm. A "specific stiffness" as illustrated in Table 2 was obtained by dividing a Young's modulus by a bulk density. Among the fabricated samples, a sample with a water absorption rate that was 0.05% or less had a high stiffness in such a manner that any of Young's moduli that were obtained by a nanoindenter method under a room temperature (25° C.) was 133 GPa or greater.

Furthermore, processability of the fabricated samples was evaluated by a surface roughness (Ra, PV) thereof. A sample with a diameter of 100 mm and a thickness of 80 mm was prepared for measuring a surface roughness (Ra, PV) of the sample. First, a principal surface of the prepared sample (a surface with a diameter of 100 nm) was mirror-surface-polished. Then, a surface roughness (Ra, PV) of a polished surface was measured. For measurement of a surface roughness (Ra, PV), an optical interferometric shape length measurement machine (AMETEC New View 9000) was used. For a determination criterion/criteria, passing or failing is illustrated in Table 2 while a surface roughness (Ra) of 1 nm or less and a maximum depth (PV) of 100 nm or less were provided as determination criteria for passing. In this case, O as illustrated in Table 2 is passing. ×is a surface roughness (Ra) that was greater than 1 nm or a maximum depth (PV) that was greater than 100 nm. Additionally, evaluation of processability was not executed for a sample with a bulk density that was less than 2 g/cm³. Whereas sample No. 12 was "failing" in the determination criteria as described above, other samples (sample Nos. 1 to 8 and 10) were "passing". For sample Nos. 1 to 10, precipitation of mullite could not substantially be confirmed.

TABLE 1

| Sample No. | Preparation composition | | | | | External addition | Firing temperature (° C.) | Water absorption rate (%) | Thermal expansion behavior at 10 to 50° C. |
|---|---|---|---|---|---|---|---|---|---|
| | MgO mass % | Al$_2$O$_3$ mass % | Bi$_2$O$_3$ mass % | B$_2$O$_3$ mass % | SiO$_2$ mass % | CaCO$_3$ mass % | | | |
| 1 | 13.7 | 32.1 | 1.6 | 1.5 | 51.1 | — | 1440 | 0.00 | U-shape |
| 2 | 13.8 | 28.5 | 2.2 | 4.0 | 51.4 | — | 1440 | 0.01 | U-shape |
| 3 | 13.6 | 29.3 | 3.2 | 3.1 | 50.8 | — | 1440 | 0.05 | U-shape |
| 4 | 13.5 | 30.2 | 4.0 | 2.1 | 50.2 | — | 1440 | 0.01 | U-shape |
| 5 | 13.2 | 26.0 | 4.6 | 6.8 | 49.4 | — | 1440 | 0.01 | U-shape |
| 6 | 18.3 | 31.4 | 2.9 | 0.0 | 47.3 | — | 1440 | 0.01 | U-shape |
| 7 | 19.0 | 28.9 | 0.0 | 3.0 | 49.1 | — | 1440 | 0.02 | U-shape |
| 8 | 17.3 | 26.3 | 6.9 | 5.1 | 44.4 | — | 1440 | 0.03 | U-shape |
| 9 | 18.8 | 32.6 | 0.4 | 0.1 | 48.1 | — | 1440 | 10 | U-shape |
| 10 | 11.9 | 18.9 | 17.2 | 7.8 | 44.3 | — | 1440 | 0.04 | U-shape |
| 11 | 17.8 | 26.6 | 0.0 | 0.0 | 55.6 | — | 1440 | 20 | U-shape |
| 12 | 17.8 | 26.6 | 0.0 | 0.0 | 55.6 | 0.9 | 1440 | 0.01 | U-shape |

TABLE 2

| Sample No. | Temperature where an extension rate of a sample was minimum in a change of thermal expansion at 20 to 30° C. (° C.) | ΔCTE at 20 to 30° C. (×10$^{-9}$/K) | Pseudo thermal expansion rate (×10$^{-7}$/K) | Bulk density of a sintered body | | | Young's modulus of a sintered body (GPa) | Specific stiffness (GPa · cm$^3$)/g | Containment ratio of a mullite phase (%) | Processability |
|---|---|---|---|---|---|---|---|---|---|---|
| | | | | Whole (g/cm$^3$) | Outer side (g/cm$^3$) | Inner side (g/cm$^3$) | | | | — |
| 1 | 23 | 80 | 1.67 | 2.49 | 2.49 | 2.49 | 135 | 54 | 0 | ○ |
| 2 | 24 | 81 | 0.55 | 2.48 | 2.48 | 2.48 | 136 | 55 | 0 | ○ |
| 3 | 24 | 76 | 0.06 | 2.48 | 2.48 | 2.48 | 139 | 56 | 0 | ○ |
| 4 | 24 | 86 | 0.63 | 2.48 | 2.48 | 2.48 | 136 | 55 | 0 | ○ |
| 5 | 27 | 87 | 2.00 | 2.49 | 2.49 | 2.49 | 135 | 54 | 0 | ○ |
| 6 | 20 | 89 | 2.73 | 2.48 | 2.48 | 2.48 | 134 | 54 | 0 | ○ |
| 7 | 20 | 91 | 3.87 | 2.48 | 2.48 | 2.48 | 135 | 54 | 0 | ○ |
| 8 | 20 | 93 | 3.40 | 2.48 | 2.48 | 2.48 | 135 | 54 | 0 | ○ |
| 9 | 20 | 93 | 5.03 | 1.84 | 1.84 | 1.83 | 50 | 27 | 0 | — |
| 10 | 30 | 91 | 5.43 | 2.47 | 2.47 | 2.47 | 133 | 54 | 0 | ○ |
| 11 | 20 | 103 | 2.19 | 1.65 | 1.64 | 1.65 | 48 | 29 | 0.2 | — |
| 12 | 22 | 102 | 2.19 | 2.55 | 2.55 | 2.55 | 145 | 57 | 0.3 | x |

As is clear from results of Table 1 and table 2, for samples (sample Nos. 1 to 5) where a cordierite crystalline phase was provided as a main crystalline phase, Mg was of 13.2% by mass or more and 13.8% by mass or less in an MgO equivalent, Al was of 26.0% by mass or more and 32.1% by mass or less in an Al$_2$O$_3$ equivalent, Bi was of 1.6% by mass or more and 4.6% by mass or less in a Bi$_2$O$_3$ equivalent, B was of 1.5% by mass or more and 6.8% by mass or less in a B$_2$O$_3$ equivalent, Si was of 49.4% by mass or more and 51.4% by mass or less in an SiO$_2$ equivalent, and a water absorption rate was 0.05% or less, behavior of thermal expansion thereof was a U-shape, NPO temperatures thereof were 23 to 27° C., and pseudo thermal expansion rates thereof were 2×10$^{-7}$/° C. or less. As X-ray diffraction was executed for these samples so as to execute identification of crystalline phases thereof, a cordierite crystalline phase was a main crystalline phase in any sample. Furthermore, bulk densities thereof were 2.49 g/cm$^3$ or less.

Among these samples, for samples (sample Nos. 1 to 4) where Mg was of 13.5% by mass or more and 13.8% by mass or less in an MgO equivalent, Al was of 28.5% by mass or more and 32.1% by mass or less in an Al$_2$O$_3$ equivalent, Bi was of 1.6% by mass or more and 4.0% by mass or less in a Bi$_2$O$_3$ equivalent, B was of 1.5% by mass or more and 4.0% by mass or less in a B$_2$O$_3$ equivalent, and Si was of 50.2% by mass or more and 51.4% by mass or less in an SiO$_2$ equivalent, pseudo thermal expansion rates thereof were 1.67×10$^{-7}$/K or less.

Moreover, for samples (sample Nos. 2 and 3) where Mg was of 13.6% by mass or more and 13.8% by mass or less in an MgO equivalent, Al was of 28.5% by mass or more and 29.3% by mass or less in an Al$_2$O$_3$ equivalent, Bi was of 2.2% by mass or more and 3.2% by mass or less in a Bi$_2$O$_3$ equivalent, B was of 3.1% by mass or more and 4.0% by mass or less in a B$_2$O$_3$ equivalent, and Si was of 50.8% by mass or more and 51.4% by mass or less in an SiO$_2$ equivalent, pseudo thermal expansion rates thereof were 0.55×10$^{-7}$/K or less.

Furthermore, for samples (sample Nos. 2 to 4) where Mg was of 13.5% by mass or more and 13.8% by mass or less in an MgO equivalent, Al was of 28.5% by mass or more and 30.2% by mass or less in an Al$_2$O$_3$ equivalent, Bi was of 2.2% by mass or more and 4.0% by mass or less in a Bi$_2$O$_3$ equivalent, B was of 2.1% by mass or more and 4.0% by mass or less in a B$_2$O$_3$ equivalent, and Si was of 50.2% by mass or more and 51.4% by mass or less in an SiO$_2$ equivalent, water absorption rates thereof were 0.05% or less, pseudo thermal expansion rates thereof were 0.63×10$^{-7}$/K or less, bulk densities of sintered bodies of whole samples were 2.48 g/cm$^3$, and Young's moduli of samples that were sintered bodies were 136 GPa or greater. Moreover, specific stiffnesses that were obtained by dividing a Young's modulus by a bulk density were 55 (GPa·cm$^3$)/g or greater.

Sample Nos. 1 to 5 as illustrated above were materials that exhibited high Young's moduli although they had low bulk densities. That is, sample Nos. 1 to 5 were materials with a high specific stiffness. For example, in a case where a material with such a high specific stiffness is used as a base for a precise processing instrument and/or a measurement instrument, it is possible to decrease an inertial force that is generated at a time when the base moves. Furthermore, a material as described above is useful for a fixing part of an optical instrument such as an astronomical telescope and/or a precision instrument such as a reflective mirror. Moreover, it is also suitable for a component that is mounted on an artificial satellite where a material with low thermal expansion, a light weight, and a high stiffness is needed.

On the other hand, for samples outside a composition as described above (samples 6 to 11), any of pseudo thermal expansion rates thereof was $2.19 \times 10^{-7}$/K or greater.

Furthermore, although a low surface roughness (Ra, PV) of a mirror-surface-processed surface is needed in a case where it is used for an optical component such as a mirror, a hard mullite phase is substantially absent in a cordierite-based ceramic(s) in the present embodiment, so that it is possible to readily execute mirror surface processing that satisfies reference Ra and PV that are used for a mirror.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

The invention claimed is:

1. A cordierite-based opaque ceramic, consisting of:
a main crystalline phase thereof is a cordierite crystalline phase;
a content of Mg is 13.2% by mass or more and 13.8% by mass or less in an MgO equivalent;
a content of Al is 26.0% by mass or more and 32.1% by mass or less in an Al$_2$O$_3$ equivalent;
a content of Bi is 1.6% by mass or more and 4.6% by mass or less in a B$_2$O$_3$ equivalent;
a content of B is 1.5% by mass or more and 6.8% by mass or less in a B$_2$O$_3$ equivalent;
a content of Si is 49.4% by mass or more and 51.4% by mass or less in an SiO$_2$ equivalent; and
a pseudo thermal expansion rate of a cordierite-based opaque ceramic is between 0.06 X $10^{-7}$/K and $2.19 \times 10^{-7}$/K.

2. The cordierite-based opaque ceramic according to claim 1, wherein:
a content of Mg is 13.5% by mass or more and 13.8% by mass or less in an MgO equivalent;
a content of Al is 28.5% by mass or more and 32.1% by mass or less in an Al$_2$O$_3$ equivalent;
a content of Bi is 1.6% by mass or more and 4.0% by mass or less in a Bi$_2$O$_3$ equivalent;
a content of B is 1.5% by mass or more and 4.0% by mass or less in a B$_2$O$_3$ equivalent; and
a content of Si is 50.2% by mass or more and 51.4% by mass or less in an SiO$_2$ equivalent.

3. The cordierite-based opaque ceramic according to claim 1, wherein:
a content of Mg is 13.5% by mass or more and 13.8% by mass or less in an MgO equivalent;
a content of Al is 28.5% by mass or more and 30.2% by mass or less in an Al$_2$O$_3$ equivalent;
a content of Bi is 2.2% by mass or more and 4.0% by mass or less in a Bi$_2$O$_3$ equivalent;
a content of B is 2.1% by mass or more and 4.0% by mass or less in a B$_2$O$_3$ equivalent; and
a content of Si is 50.2% by mass or more and 51.4% by mass or less in an SiO$_2$ equivalent.

4. The cordierite-based opaque ceramic according to claim 1, wherein:
a content of Mg is 13.6% by mass or more and 13.8% by mass or less in an MgO equivalent;
a content of Al is 28.5% by mass or more and 29.3% by mass or less in an Al$_2$O$_3$ equivalent;
a content of Bi is 2.2% by mass or more and 3.2% by mass or less in a Bi$_2$O$_3$ equivalent;
a content of B is 3.1% by mass or more and 4.0% by mass or less in a Bi$_2$O$_3$ equivalent; and
a content of Si is 50.8% by mass or more and 51.4% by mass or less in an SiO$_2$ equivalent.

5. The cordierite-based opaque ceramic according to claim 1, wherein behavior of thermal expansion thereof in a temperature range of 0° C. to 50° C. has a temperature where an extension rate is minimum, indicates a negative slope on a lower temperature side that is lower than the temperature, and indicates a positive slope on a higher temperature side that is higher than the temperature.

6. A member for a telescope that is composed of the cordierite-based opaque ceramic according to claim 1.

7. A cordierite-based opaque ceramic, consisting of:
a main crystalline phase thereof is a cordierite crystalline phase;
a content of Mg is 13.2% by mass or more and 13.8% by mass or less in an MgO equivalent;
a content of Al is 26.0% by mass or more and 32.1% by mass or less in an Al$_2$O$_3$ equivalent;
a content of Bi is 1.6% by mass or more and 4.6% by mass or less in a Bi$_2$O$_3$ equivalent;
a content of B is 1.5% by mass or more and 6.8% by mass or less in a B$_2$O$_3$ equivalent;
a content of Si is 49.4% by mass or more and 51.4% by mass or less in an SiO$_2$ equivalent; and
a pseudo thermal expansion rate of a cordierite-based opaque ceramic is between 0.06 X $10^{-7}$/K and $2.00 \times 10^{-7}$/K.

8. The cordierite-based opaque ceramic according to claim 7, wherein:
a content of Mg is 13.5% by mass or more and 13.8% by mass or less in an MgO equivalent;
a content of Al is 28.5% by mass or more and 32.1% by mass or less in an Al$_2$O$_3$ equivalent;
a content of Bi is 1.6% by mass or more and 4.0% by mass or less in a Bi$_2$O$_3$ equivalent;
a content of B is 1.5% by mass or more and 4.0% by mass or less in a B$_2$O$_3$ equivalent; and
a content of Si is 50.2% by mass or more and 51.4% by mass or less in an SiO$_2$ equivalent.

9. The cordierite-based opaque ceramic according to claim 7, wherein:
a content of Mg is 13.5% by mass or more and 13.8% by mass or less in an MgO equivalent;
a content of Al is 28.5% by mass or more and 30.2% by mass or less in an Al$_2$O$_3$ equivalent;
a content of Bi is 2.2% by mass or more and 4.0% by mass or less in a Bi$_2$O$_3$ equivalent;

a content of B is 2.1% by mass or more and 4.0% by mass or less in a $B_2O_3$ equivalent; and a content of Si is 50.2% by mass or more and 51.4% by mass or less in an $SiO_2$ equivalent.

10. The cordierite-based opaque ceramic according to claim 7, wherein:

a content of Mg is 13.6% by mass or more and 13.8% by mass or less in an MgO equivalent;

a content of Al is 28.5% by mass or more and 29.3% by mass or less in an $Al_2O_3$ equivalent;

a content of Bi is 2.2% by mass or more and 3.2% by mass or less in a $Bi_2O_3$ equivalent;

a content of B is 3.1% by mass or more and 4.0% by mass or less in a $B_2O_3$ equivalent; and a content of Si is 50.8% by mass or more and 51.4% by mass or less in an $SiO_2$ equivalent.

11. The cordierite-based opaque ceramic according to claim 7, wherein behavior of thermal expansion thereof in a temperature range of 0° C. to 50° C. has a temperature where an extension rate is minimum, indicates a negative slope on a lower temperature side that is lower than the temperature, and indicates a positive slope on a higher temperature side that is higher than the temperature.

12. A member for a telescope that is composed of the cordierite-based opaque ceramic according to claim 7.

* * * * *